US008885048B2

(12) United States Patent
Liu

(10) Patent No.: US 8,885,048 B2
(45) Date of Patent: Nov. 11, 2014

(54) COMPUTER VISION AND RADIO FREQUENCY IDENTIFICATION TECHNOLOGY BASED BOOK ENROLMENT MANAGEMENT APPARATUS

(75) Inventor: Hanguang Liu, Kowloon (HK)

(73) Assignee: Rainbow Spirit Limited, Hong Kong (HK)

( * ) Notice: Subject to any disclaimer, the term of this patent is extended or adjusted under 35 U.S.C. 154(b) by 236 days.

(21) Appl. No.: 13/519,071

(22) PCT Filed: Dec. 23, 2010

(86) PCT No.: PCT/CN2010/080150
§ 371 (c)(1),
(2), (4) Date: Jun. 25, 2012

(87) PCT Pub. No.: WO2011/076127
PCT Pub. Date: Jun. 30, 2011

(65) Prior Publication Data
US 2012/0268606 A1  Oct. 25, 2012

(30) Foreign Application Priority Data
Dec. 24, 2009 (CN) .......................... 2009 1 0200612

(51) Int. Cl.
*H04N 7/18* (2006.01)
*G06Q 10/06* (2012.01)

(52) U.S. Cl.
CPC ..................................... *G06Q 10/06* (2013.01)
USPC ............ 348/159; 348/135; 348/142; 348/160

(58) Field of Classification Search
USPC .................................. 348/135, 142, 159, 160
See application file for complete search history.

(56) References Cited

U.S. PATENT DOCUMENTS 7,961,936 B2 *  6/2011  Liang et al. ................... 382/154
2008/0240612 A1 * 10/2008  Liang et al. ................... 382/284

FOREIGN PATENT DOCUMENTS

CN              101064026 A       10/2007

* cited by examiner

*Primary Examiner* — Geepy Pe
(74) *Attorney, Agent, or Firm* — Baker Hostetler LLP

(57) ABSTRACT

The invention discloses a computer vision and radio frequency identification technology based book enrolment management apparatus, which comprises an image acquisition working platform, an image acquisition device, an RFID tag reader/written and antenna group for extracting information characteristics of the book to control and operate embedded firmware modules to analyze the image acquired information characteristics of each registered book, and record them in a storage database and RFID tag.

10 Claims, 11 Drawing Sheets

COMPUTER VISION AND RADIO FREQUENCY IDENTIFICATION TECHNOLOGY BASED BOOK ENROLMENT MANAGEMENT APPARATUS

FIELD OF THE INVENTION

The invention relates to a book enrolment management apparatus, in particular to the book enrolment management apparatus which is implemented by the embedded information technology, computer vision and image processing technology, and Radio Frequency Identification (RFID) technology and applicable to an automatic management system of a library.

BACKGROUND OF THE INVENTION

At present, there are hundreds of thousands of libraries in the world, and there are tens of thousands libraries for the government, public and university, therefore, a fast and effective library service is required by the modern society. Throughout the world, in many public and university libraries in society, the RFID technology has been used to replace or optimize the barcode identification and magnetic strip anti-theft technology since 1990s, which has been widely used for many years in the libraries, in order to improve the management efficiency and accuracy, and provide a more convenient public service.

Nowadays, there are usually several kinds of book enrolment management ways and systems, and the very common one is the barcode system, which reads barcode information attached on a book by a barcode reader to access a computer and a database when in use, and then other flow is manually processed by an operator according to the condition of each library. The barcode system has many defects, as follows: the barcode must be scanned one by one and the scanning direction and location must be specific and unobstructed; the barcode has a small data capacity which is as big as only a very small character, and can only contain figures and letters, so as to fail to store more information related to the books; the printing quality of the barcode is easy to get worse and easily affected by other things or dusts; during the book enrolment, the input of other information still needs the manual operation of the operator; and in the borrowing and returning process of the book, a user will also be subjected to the influence on the operation due to the defects, so as to greatly reduce the automation efficiency of the library. In addition, the barcode cannot be read once damaged, thereby bringing a lot of inconvenience and trouble to the daily book management. Nowadays, the emerging RFID book management system is gradually overcoming the defects of the barcode management system. With continuous improvement and wide application, the RFID technology has achieved the effect of taking shape, and a self-borrowing and self-returning system and device for the book has been developed to increase the circulation and use amount of the book in a library, thereby providing the user with a better service. These system and device can accurately and fast acquire and recognize the information of the book by the unique identifier stored in the RFID tag chip attached in the book and its related data. During the book enrolment, the operator will attach an RFID tag to each book so as to store more information related to the book, including the unique characteristic, such as length, width, depth, weight and image characteristic of the front cover of the book since the RFID tag may store a large amount of data.

However, in order to implement the RFID system, a lot of money, labour and time are required, meanwhile, a new tag will be attached to the original book and the barcode data will be transferred. Furthermore, in the borrowing and returning process of the books, the existing RFID book system still has defects, for example, a use may transfer a tag to another book, so that the aim of implementing self-borrowing and self-returning by the RFID book management system is further limited. Therefore, these defects can be overcome if the RFID tag can store more data about the own characteristics of the book to implement self verification. However, no advanced intelligent book enrolment management apparatus can provide such function, fast collect, analyze and acquire the characteristics of the book, and store them in the RFID tag of the book in real time at present.

SUMMARY OF THE INVENTION

In order to solve the problem, the invention provides an advanced intelligent book enrolment management apparatus, which can collect, analyze, acquire and store the characteristics of a book, and complete the book enrolment flow in combination with the unique advantage of the RFID technology in the one-apparatus, one-stop and one-step ways, so as to overcome the defects of the conventional art and system as well as creating a new foundation for the future automatic book management requirement.

The technical solution of the invention is: The invention discloses a computer vision and RFID technology based book enrolment management apparatus, including an image acquisition working platform, an image acquisition apparatus, an RFID tag reader/writer and antenna group, an electronic anti-theft magnetizing/demagnetizing apparatus, a weight measurement device, and an embedded central processing unit, wherein the image acquisition working platform provides an operating platform which makes the images of the spine and fore edge of the book and the image group of the front cover of the book on the same optical acquisition plane and connected with one another, the images of the spine and fore edge are reflected to the image acquisition range of a camera group which perform real-time and synchronous shooting to acquire the images of the spine, fore edge and front cover of the book, the image acquisition working platform includes a chessboard for putting the book, the chessboard has a pattern for the reference of the camera group, a transparent baffle group, and a reflector mirror group, the transparent baffle group is vertically arranged at a corner of the image acquisition working platform to form a right angle to which the book is tightly close in order to ensure that the spine and fore edge can also be completely close to the transparent baffle, and the reflector mirror group is obliquely arranged at the other edge of the transparent baffle to form an angle with the image acquisition working platform in order to completely reflect the images of the whole spine and fore edge to the image acquisition range of the camera group above;

the image acquisition apparatus is composed of the camera group and arranged above the image acquisition working platform to acquire the image of the book on the image acquisition working platform;

the RFID tag reader/writer is connected with the antenna group and configured to read/write the RFID tag;

the antenna group consists of multiple RF antenna elements in which adjustment circuits are arranged to adjust the sensitivity of the RF antenna elements, and is arranged below the image acquisition working platform;

the electronic anti-theft magnetizing/demagnetizing apparatus is configured to activate or deactivate the magnetism of the anti-theft magnetic strip of the book;

the weight measurement device is arranged below the chessboard of the image acquisition working platform to measure the weight of the book on the image acquisition working platform; and the embedded central processing unit is configured to control and operate all the embedded firmware modules, including an image acquisition module, a storage module, a computer vision image processing module, an image analysis module, an RFID tag reading/writing module, an RFID tag data storage module, a monitoring engine module, a management service module and a prompt running module.

According to one embodiment of the computer vision and RFID technology based book enrolment management apparatus of the invention, the image acquisition module further includes:

a manual image acquisition sub-module which is a multiple-lens image acquisition system and can acquire the image group of the book in turn or synchronously;

a light source control sub-module which is configured to provide and control efficient and even light source for the image acquisition; and an automatic image acquisition trigger sub-module which is connected with the image acquisition sub-module to automatically trigger the image acquisition module to realize the image acquisition function by the image change within the image acquisition range.

According to one embodiment of the computer vision and RFID technology based book enrolment management apparatus of the invention, the storage module is connected with the image acquisition apparatus and the computer vision image processing module, and includes an original image storage database unit and a book enrolment data storage database unit, wherein the original image storage database unit is configured to store the acquired original image of the book, and the book enrolment data storage database unit is configured to store the analyzed book characteristics.

According to one embodiment of the computer vision and RFID technology based book enrolment management apparatus of the invention, the computer vision image processing module is connected with the image acquisition apparatus to make the acquired book image group into a two-dimensional book image and analyze the two-dimensional book image to acquire the book characteristics, and is provided with a computer image making sub-module for making the two-dimensional book image, and the computer image making sub-module further includes:

a detection unit which is configured to detect the two-dimensional location of the reference pattern of the camera group in the camera;

an image rectification unit which is configured to rectify distorted images acquired by one or more cameras;

an image combination unit which is connected to the image rectification unit to combine the rectified images by detecting the similarities and differences of multiple images;

an intelligent selection unit which is configured to automatically cut and remove the non-book image area according to the book image and the background of the image acquisition working platform in the book image group, identify the book boundaries and make the spin, fore edge and front cover; and a processed image storage database unit which is connected with the intelligent selection unit and configured to store the processed book images.

According to one embodiment of the computer vision and RFID technology based book enrolment management apparatus of the invention, the computer vision image processing module is provided with an image analysis sub-module which is configured to analyze the two-dimensional book image group to acquire the book characteristics, and the image analysis sub-module further includes:

an image size measurement unit which is configured to measure the length, width and depth of the book;

an image template extraction unit which is configured to extract the template of the book according to the characteristic point of the book image to distinguish the characteristic of the book image in the future;

a library barcode recognition unit which is configured to recognize the location of the library barcode and extract the image of the library barcode;

an International Standard Book Number (ISBN) barcode recognition unit, which is configured to recognize the location of the ISBN barcode and extract the image of the ISBN barcode;

a call number barcode recognition unit, which is configured to recognize the location of the call number barcode and extract the image of the call number barcode;

a threshold analysis and selection unit which is configured to find and set the most optimal model threshold, system distortion and size error value and matching audit;

an optical character analysis unit which is configured to analyze the character information from the extracted images of the library barcode, ISBN barcode and call number barcode; and a characteristic/image storage database unit which is configured to store the book image and the book characteristics, wherein the book image includes the image templates of the front cover, spine, back cover and fore edge, and the book characteristics includes length, width, depth of the book and size category, weight and weight category, ISBN location, library barcode location, call number location, RFID tag location, RFID tag chip number, ISBN, library barcode number, call number, and the record information of the read/written RFID tag chip.

According to one embodiment of the computer vision and RFID technology based book enrolment management apparatus of the invention, the RFID tag data storage module is configured to define the address of memory location in the chip where the tags of all the images and book characteristics are stored, and the unique address of relevant memory location is provided for the user to read/write the book characteristics stored in the chip.

According to one embodiment of the computer vision and RFID technology based book enrolment management apparatus of the invention, the RFID tag reading/writing module is connected with the RFID tag data storage module and further includes:

reader/writer firmware which is configured to read/write the characteristic of the RFID tag chip in the book, and read the book characteristics or write it into the RFID tag chip in the book based on the access unit location in the RFID tag data storage module; and an RFID tag location analysis unit which is configured to identify the location of the RFID tag on the book by the non-contact electromagnetic induction.

According to one embodiment of the computer vision and RFID technology based book enrolment management apparatus of the invention, the apparatus further includes:

a monitoring engine module which is connected with each component of the book enrolment management apparatus to monitor the running status of all the components and further includes:

a module running status reporting unit which is configured to extract the current running status of each component in the apparatus, create a failure log, and send the information of failure status to the specified record place; and an automatic repair unit which is configured to repair the module in the failure status without interfering the system application or service program according to the predicted improper running.

According to one embodiment of the computer vision and RFID technology based book enrolment management apparatus of the invention, the apparatus further includes:

a management service module which is provided for the operator to remotely or locally manage and monitor the information of the book enrolment management apparatus;

an upgrade unit which is configured to upgrade firmware or software by a local port or a remote network;

a reporting unit which is configured to send the current running status of each module in the apparatus to the operator;

a parameter setting unit which is provided for the operator to input the related parameters of each module in the apparatus and set the system setting value;

a data extraction and download unit which is configured to extract and download data and automatically establish a related data download connection; and an image area setting unit which is configured to select or define an image area in a specific range in the original image of the storage module in order to manually cut a correct image of the front cover or spine.

According to one embodiment of the computer vision and RFID technology based book enrolment management apparatus of the invention, the apparatus further includes:

a prompt running status module which is configured to send a prompt signal to the operator according to the running state, and further includes:

a voice prompt control unit which is configured to notify the operator of the enrolment management status by a voice signal; and a flash prompt control unit which is configured to notify the operator of the enrolment management status by an optical signal.

Compared with the prior art, the invention has the following innovative effects: the technical solution of the book enrolment management apparatus of the invention is that: the own characteristic of the book is extracted and analyzed by the embedded information technology, computer vision and image processing technology and RFID technology so as to fast collect, store, rectify, combine and analyze the image and acquire the characteristic of each registered book, and record them in the storage database and the RFID tag. The RFID tag can record the image templates of the front cover, spine, back cover and fore edge of the book, and the book characteristics includes book size (length, width and thickness) or size category, weight and weight category, library barcode location, ISBN location, call number location, RFID tag location, RFID tag chip number, ISBN, library barcode number, call number, and the record information of the read/written RFID tag chip, and the principle is similar to the enrolment of the human biological characteristic data. Even the RFID tag is damaged or invalid, the automation system still can authenticate the identity of the book according to other characteristics of the book in the future, thereby effectively improving the efficiency and effect of the automatic circulation system for the book. The own characteristic of the book is unchangeable, and a lot of characteristics of the book can be extracted, so that the authentication accuracy is ensured. The book enrolment management apparatus of the invention is an independent embedded apparatus, so that the operator can acquire the required book image, extract and analyze the image characteristic, perform magnetization and demagnetization, and finally write the book characteristics into the RFID tag of the book by the RFID tag reader/writer at a time.

DETAILED DESCRIPTION OF THE EMBODIMENTS

The invention is further described below with reference to drawings and embodiments.

Figure 1:
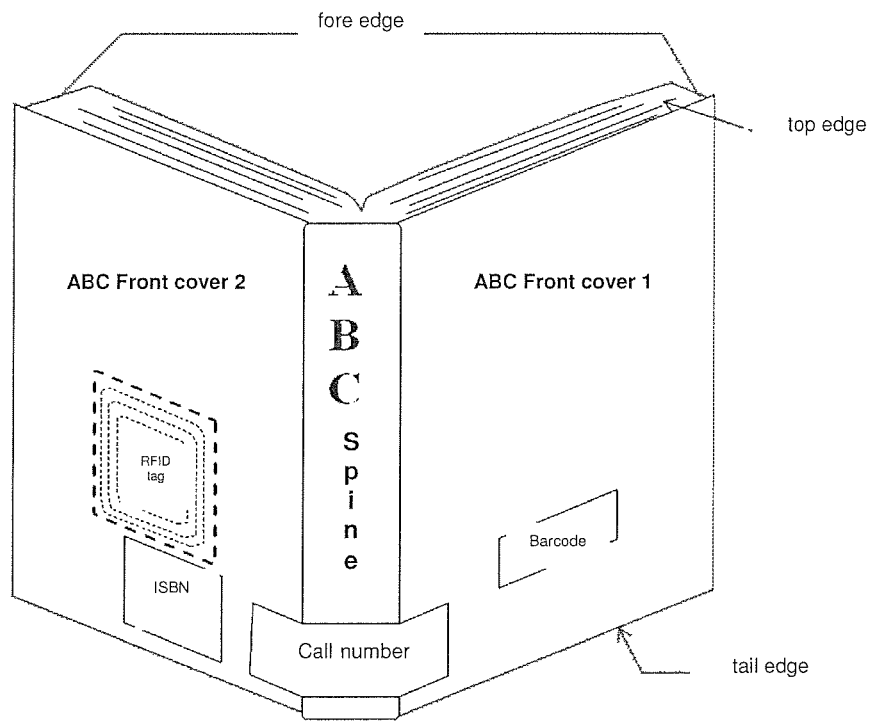
FIG. 1 is a diagram of an example of a book used in the invention.

An example of the book used by the book enrolment management apparatus of the invention is as shown in FIG. 1, in the invention, the cover of the book is called front cover, the binding side of the book is called spine, the opening of the book is called fore edge, the top of the book is called top edge, and the bottom of the book is called tail edge. The book has common book management data, including library barcode, ISBN barcode, call number code on the spine, and RFID tag hidden in the book. The example in FIG. 1 is for the convenient description of the invention, and the book enrolment management apparatus of the invention can master and distinguish any other placement forms of the book management data inside and outside the book.

Figure 2:
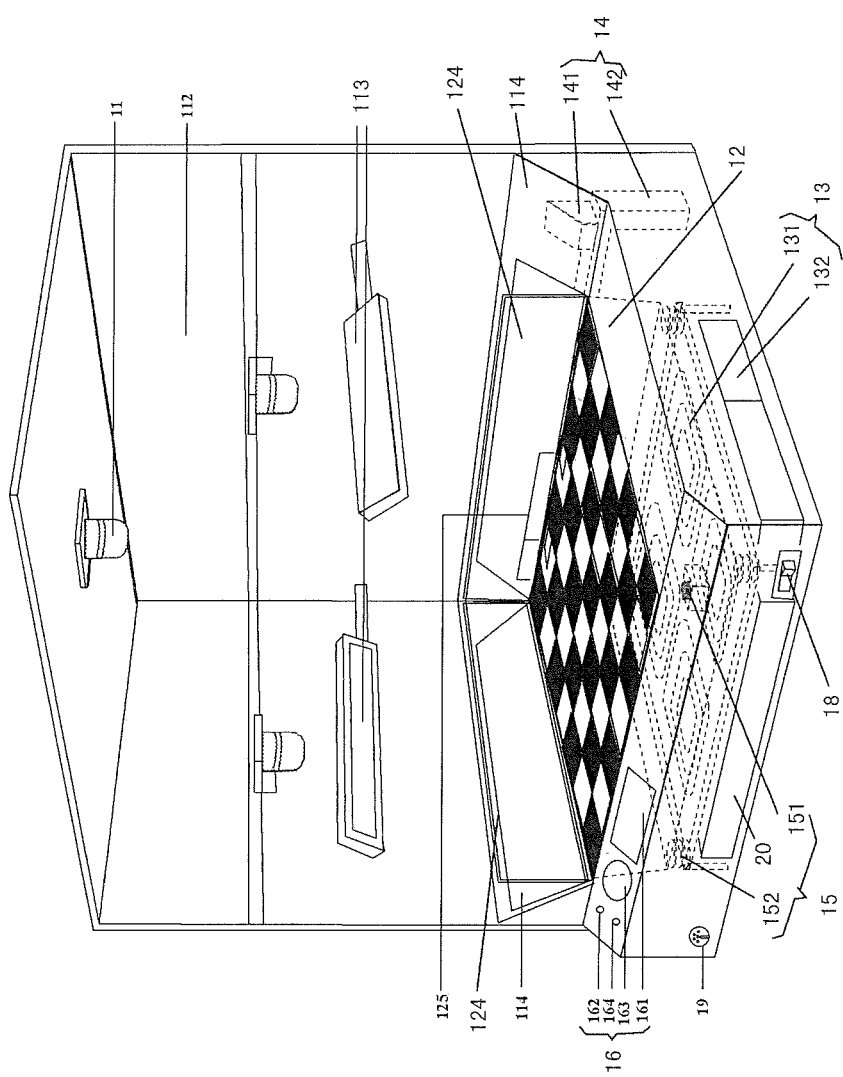
FIG. 2 is a diagram showing the structure of a book enrolment management apparatus in one preferred embodiment of the invention.

FIG. 2 shows the structure of a book enrolment apparatus in a preferred embodiment of the invention. See FIG. 2, the book enrolment apparatus in the embodiment includes an image acquisition apparatus 11, an image acquisition working platform 12, an RFID tag reader/writer and antenna group 13, an electronic anti-theft magnetizing/demagnetizing apparatus 14, a weight measurement device 15, a prompt running module 16, a communication interface (including a cable interface 17 and an RS-232 interface 19), a power switch 18 and an embedded central processing unit 20.

The image acquisition apparatus 11 includes multiple camera device groups, there are three camera device groups in the embodiment, which are arranged above the image acquisition working platform 12; each camera device group includes one or more stationary cameras in which an optical filter is arranged; the three camera device groups are configured to acquire the images of the front cover, spine and top edge of the book respectively, and can acquire the images of the back cover, fore edge and tail edge of the book when the user reverses the book, namely, it can acquire the images of the book from six different angles (the front cover, spine, top edge, back cover, fore edge, and tail edge), and finally, all the images are combined to form the image of a stereo book. The quantity and pixel of the camera depend on different book size and image quality, for example, when a book is as big as A4 paper, a camera of 4 million pixels is used, whose image and set resolution is 200 dpi, i.e., there are 200 optical points in 1 inch; and when a book is as big as A3 paper, four cameras of 4 million pixels in combination with the image combination unit in the computer vision image processing module are used to combine four book images into a book image equivalently acquired by a camera of 8 million pixels. While if a camera of 8 million pixels is directly used, the heights of the camera and image acquisition working platform 12 need increasing, which will double the volume of the whole apparatus and also increase the weight, therefore, it is a preferred solution to combine multiple vision images into a frame image by the image fitting technology.

A diffuser 112 is arranged on the top board of the image acquisition device, and a white light diode lighting bar module 113 is respectively arranged on the two sides of the book enrolment management apparatus to provide the sides with lighting and the whole image acquisition working platform 12 with even and enough luminosity, so as to improve the contrast between the book and the background, thereby improving the accuracy and efficiency of the image processing operation.

Figure 3A:
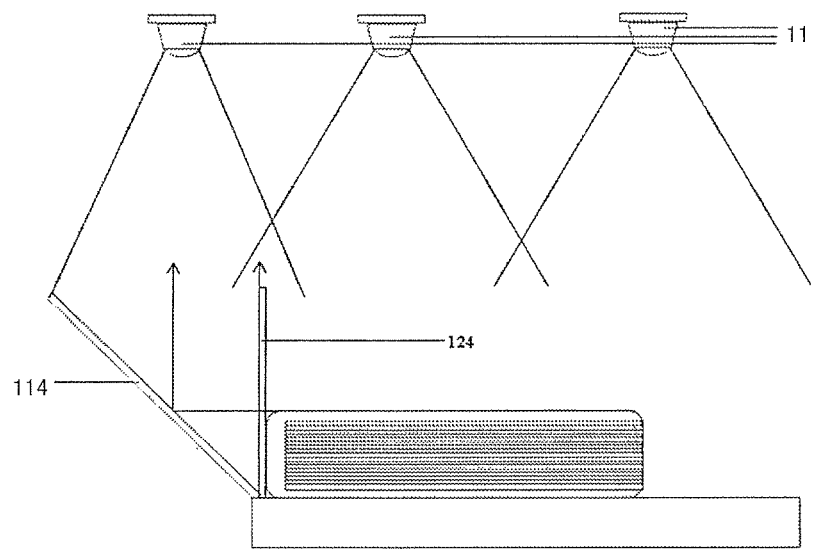
FIG. 3A is a diagram showing that an angle formed between a reflector mirror and an image acquisition working platform is enough to reflect the image of the whole spine.
Figure 3B:
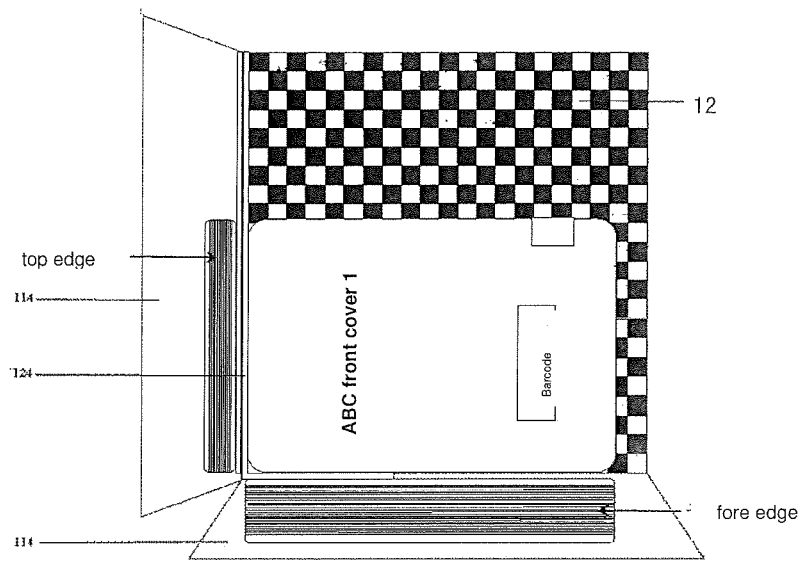
FIG. 3B is a diagram showing the acquisition of the images of the front cover and spine.
Figure 3C:
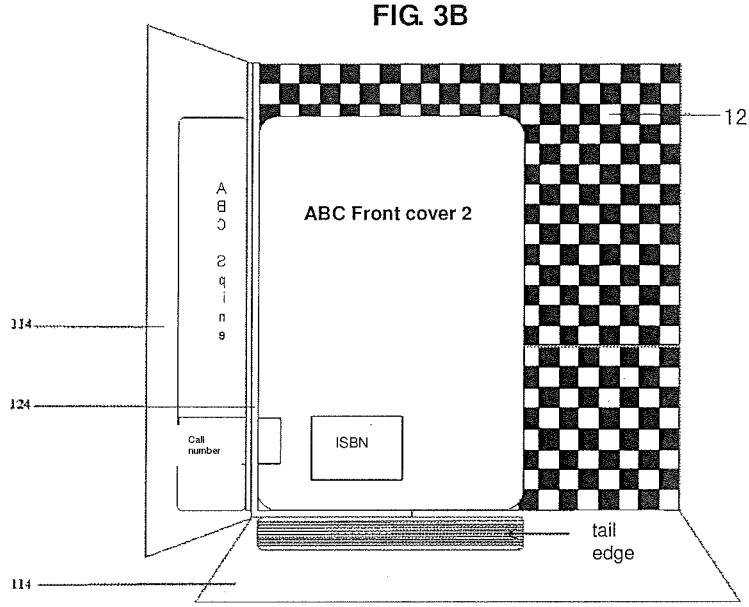
FIG. 3C is a diagram showing the acquisition of the image of the second front cover.

The image acquisition working platform 12 is made of non-metal materials as the RF antenna group is arranged below the image acquisition working platform 12 and metal interference will affect the reading distance or even cause reading failure. FIGS. 3A-3C show how to put the book on the image acquisition working platform 12 and how to sample the book. The image acquisition working platform 12 provides an operating platform which makes the images of the spine and fore edge of the book and the image group of the front cover of the book on the same optical acquisition plane and connected with one another; the images of the spine and fore edge are reflected by the inclined reflector mirror group behind the transparent baffle 124 to the image acquisition range of the camera group above; and a real-time and synchronous shooting is performed to acquire the images of the spine, fore edge and front cover of the book.

The image acquisition working platform 12 includes a chessboard for putting the book, the chessboard has a pattern for the reference of the camera group, a transparent baffle group 124, and a reflector mirror group, the operator can accurately and stably put the book on the image acquisition working platform 12 for image acquisition, and the transparent baffle group 124 is vertically arranged at a corner of the image acquisition working platform 12 to form a right angle to which the book is tightly close in order to ensure that the spine and fore edge can be completely close to the transparent baffle 124. Two location sensors 125 are configured for location verification, and the distance between the two location sensors 125 is enough to project the image of the call number code on the spine on the inclined reflector mirror group 114.

The second location sensor 125 from left ensures that the book is tightly close to the fronts of the two transparent baffles 124. The reflector mirror group is obliquely arranged on another side of the transparent baffle 124 to form an angle with the image acquisition working platform 12 in order to completely and accurately reflect the images of the whole spine and fore edge to the acquisition range of the camera group above. Then the book is reversed, similarly, the images of the fore edge and tail edge and the image of the back cover are on the same acquisition plane and connected with one another; the images of the fore edge and tail edge are transversely reflected to the acquisition range of one or more cameras to acquire the whole image; and the computer vision technology is further needed to rectify and combine the images.

The image acquisition working platform 12 further includes a camera which is configured to calibrate the plan template (such as black-and-white chessboard pattern). The black-and-white chessboard pattern can be used for the reference of the camera, and is unfavourable to perform edge detection on the book which do not have significant characteristics and is similar to the image acquisition working platform 12 in hue if some books do not have significant characteristics (such as an all-black or all-white book) and the image acquisition working platform 12 is in a single hue. As the basic characteristic of the image, the edge of the image is applied to analyzing the length, width, thickness and other sizes of the book. Since some books can only provide limited characteristics, the fractal pattern formed by irregular fractal variables can be attached on the book to increase the quantity of image point vectors (the vector being formed by connecting two points in the image). The fractal pattern can increase the characteristic points of the book, so that the image point vectors will increase along with the increase of the characteristic points of the book.

The RFID tag reader/writer and antenna group 13 includes an array RF antenna group consisting of multiple RF antenna elements, and a reader/writer. The location error of the RF antenna elements will affect the phase of the signal received by an antenna array element, and an adjustment circuit is arranged inside the RF antenna elements to adjust the sensitivity of the RF antenna elements, and adjust the phase of the signal by a decomposed Direction of Arrival (DOA) algorithm. The reader/writer can either write the book image characteristics into the RFID tag or read the related characteristics from the RFID tag.

The RFID tag reader/writer and antenna group 13 can select an RFID device of Ultra-high Frequency (UHF) or High Frequency (HF) to read an RFID code. The RFID tag reader/writer and antenna group 13 is of two structures: one is that it is composed of RFID antenna elements of UHF or HF and a reader/writer, and the other is that it is composed of an array RF antenna group of UHF or HF 131 and a reader/writer 132 (as shown in FIG. 2). The array RF antenna group 131 consists of multiple RF antenna elements. If the sensing range of the RF antenna elements is not enough to sense a very big book, the array RF antenna group 131 can be connected to the reader/writer 132 to increase the sensing range. Or, the location of the RFID tag of the book on the image acquisition working platform 12 of the book enrolment management apparatus is found at first through the array RF antenna group 131 and the reader/writer 132. The location of the RFID tag is one of the book characteristics and may be stored in a book enrolment data storage database unit.

The electronic anti-theft magnetizing/demagnetizing apparatus 14 includes an electronic anti-theft magnetizer and demagnetizer 141 and a magnetic stripe verification checker 142, and is configured to magnetize and demagnetize the electronic anti-theft tag on the book and check whether the book is completely demagnetized, as such, the book operator can register the book when a reader borrows or returns the book so as to implement the one-stop book borrowing-returning enrolment procedure.

The weight measurement device includes a sensor 151 and a spring 152 and is configured to measure the weight of the book and store the measurement result in a book enrolment data storage database unit. The sensor 151 is arranged below the whole image acquisition apparatus 11 so as to avoid blocking the image of the back cover. Once the book enrolment management apparatus is started, the sensor 151 will be reset, so that the weight measurement device 15 only measures the weight of the book being processed.

The prompt running apparatus sends a signal which prompts whether the book is registered successfully to the book operator according to the running status and includes a digital liquid crystal display screen 161, a power indicator 162, a voice prompt buzzer 163, and a flash indicator 164.

Figure 4:
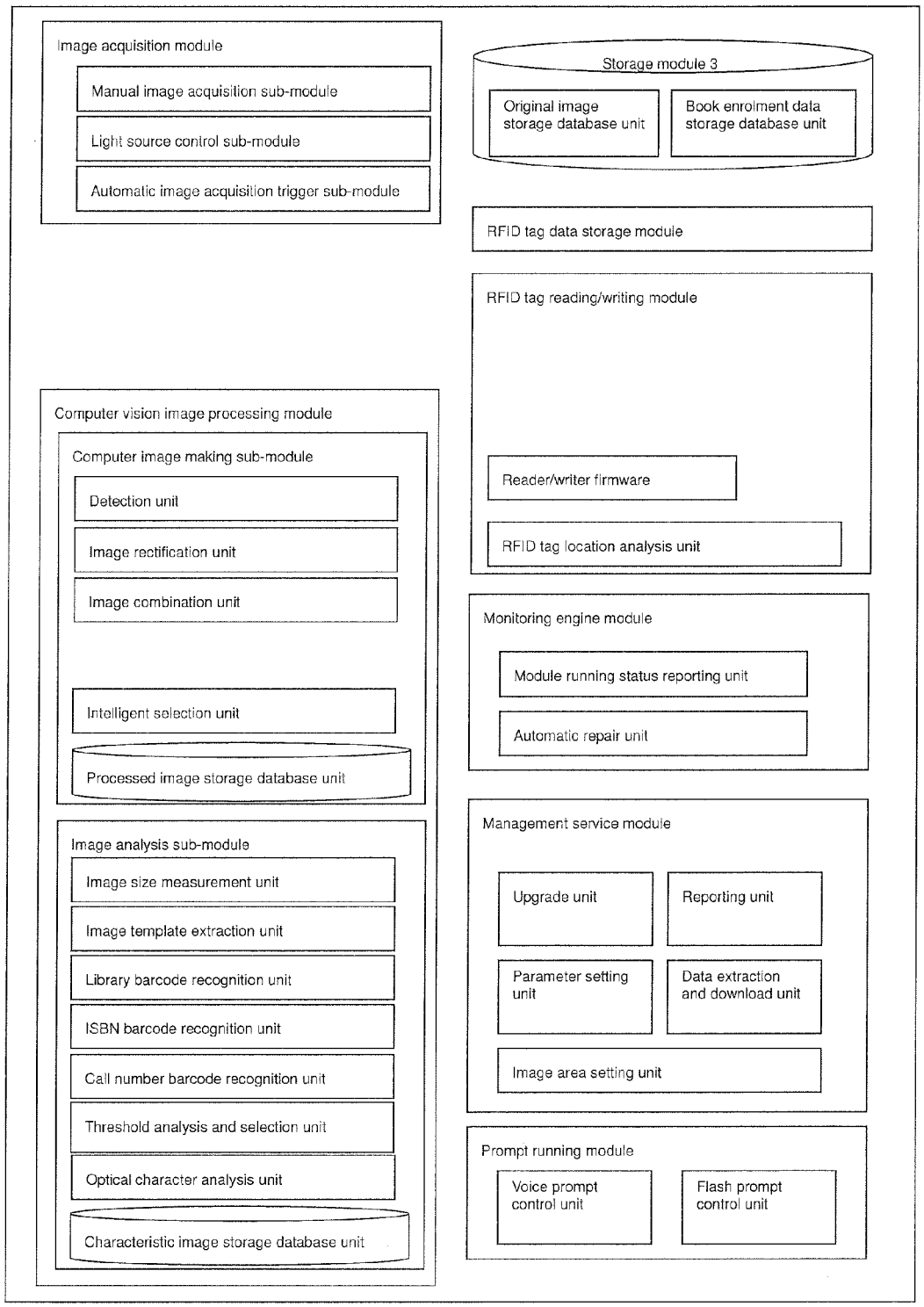
FIG. 4 is a schematic diagram of each firmware module of the book enrolment management apparatus of the invention.

FIG. 4 shows the principle of each module of the book enrolment management apparatus of the invention, and the following contents are described with reference to FIG. 4. The embedded central processing unit 20 is the core of the book enrolment apparatus and controls and operates all the embedded firmware modules, including the image acquisition module, storage module, computer vision image processing module, RFID tag reading/writing module, RFID volume label data storage module, module monitoring engine, management service module, and prompt running module.

Figure 5:
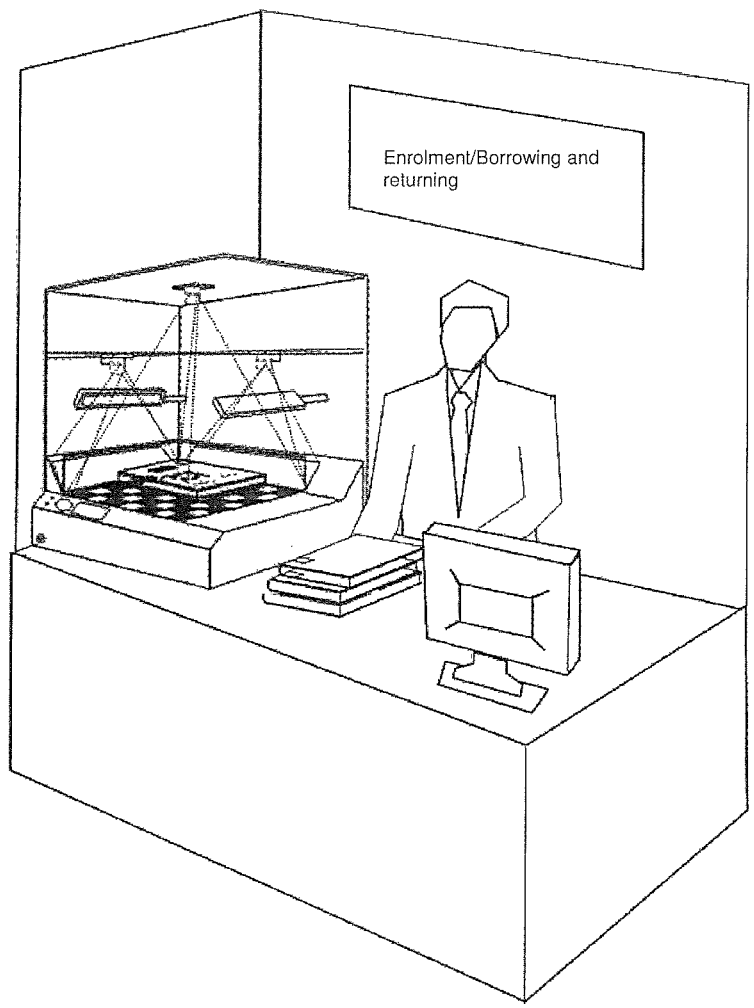
FIG. 5 is a diagram showing the application of registering/borrowing/returning a book.

The operation process of the apparatus is simply introduced in this paragraph. See FIG. 5, the operator can conveniently acquire the required image of the book as required only by putting the book on the image acquisition working platform 12 in the book enrolment management apparatus and pressing the shooting button on the book enrolment management software without adjusting the position and shooting angle of the apparatus, and the software can also be provided with other buttons which can perform magnetization and demagnetization and write the book characteristics into the RFID tag through the reader/writer. Using the computation result of background transform difference, the apparatus can trigger the camera to automatically shoot the image and use the inclined reflector mirror group to acquire the book images in three directions. The electronic anti-theft magnetizing/demagnetizing apparatus magnetizes and demagnetizes the magnetic strip in the book, meanwhile, the magnetic strip verification checker verifies and checks the magnetic force of the magnetic strip. After the book is off the image acquisition working platform for 12 h, all the apparatuses stop running. The apparatus of the invention is not only suitable for the book enrolment management, but also can be matched with other automatic borrowing-returning apparatuses, so as to increase the book management efficiency. The information which can be acquired and recorded either in the new book enrolment procedure or in the book borrowing and returning procedure shown in FIG. 5 includes: the image templates of the front cover, spine, back cover, and fore edge, and the book characteristics includes book size and size category, weight and weight category, library barcode location, ISBN location, call number location, RFID tag location, RFID tag chip number, ISBN, library barcode number, call number, and the record information of the read/written RFID tag chip.

Figure 6:
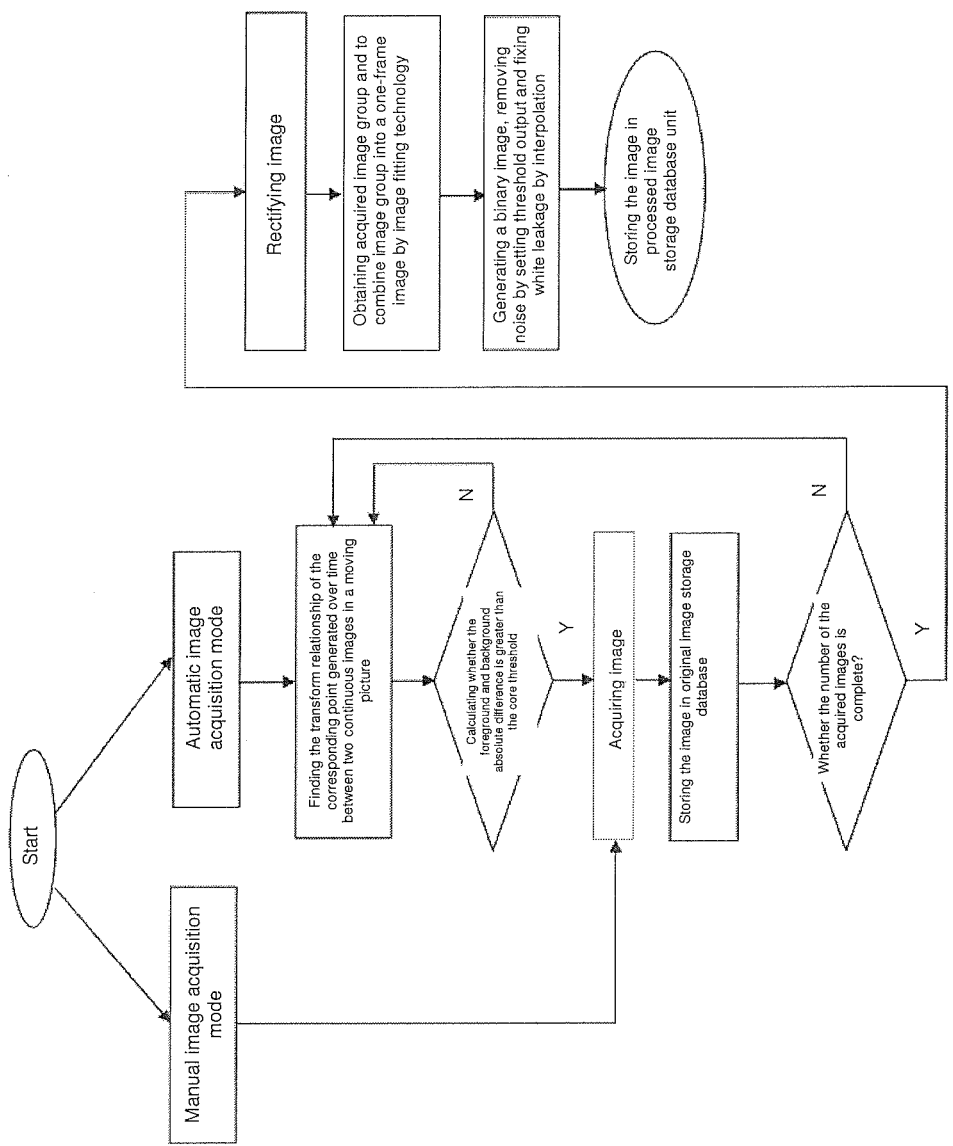
FIG. 6 is a flowchart showing the processing of the original image of the invention.

Meanwhile, see FIG. 6, the image acquisition module includes a manual image acquisition sub-module, a light source control sub-module and an automatic image acquisition trigger sub-module. The manual image acquisition sub-module is a multi-lens image acquisition system based on DirectShow which is the latest standard for media application development on Windows platform. The invention uses many USB 2.0 cameras as the image acquisition device by fully using the characteristic that DirectShow is independent of the hardware device to acquire an image sequentially or simultaneously, and the system function is mainly realized by software so as to greatly save the hardware cost. For the large-area book image acquisition, the conventional image acquisition way has many limitations on handling such practical problem, while the apparatus of the invention expands the acquisition area of book images by many cameras and rectifies and combines images by the computer vision and image processing technology. The light source control sub-module in the image acquisition apparatus 11 is auxiliary and configured for the illumination during the image acquisition and providing even light source to specifically display the image contrast of the book and background. The automatic image acquisition trigger sub-module finds the transform relationship of the corresponding point (the corresponding point is the point on the image acquisition working platform 12 on which no book is put, when the point changes, it means that the book is put on the image acquisition working platform 12 and the image acquisition is automatically triggered) generated over time between two continuous images with the aid of book image on the book enrolment management apparatus acquired by the image acquisition sub-module, calculates the foreground absolute difference, and triggers the camera to automatically shoot the book image if the difference is greater than the threshold. The corresponding point must be proper in quantity, more corresponding points causing slow computing processing speed, while less corresponding points causing wrong report. After being acquired, the original image of the book is sent to the computer vision image processing module and the original image storage database unit in the storage module.

The computer vision image processing module makes the acquired original image of the book into a two-dimensional book image and analyzes the two-dimensional book image to obtain the book characteristics. The computer vision image processing module is divided into two sub-modules: a computer image making sub-module and an image analysis sub-module. The computer image making sub-module includes a detection unit, an image rectification unit, an image combination unit, an intelligent selection unit and a processed image storage database unit. The analysis sub-module includes an image size measurement unit, an image template extraction unit, a library barcode distinguishing unit, an ISBN barcode distinguishing unit, a call number barcode distinguishing unit, a threshold analysis and selection unit, an optical character analysis unit and a characteristic/image storage database unit.

In the original image storage database unit, the original image of the book is used for backup to extract the corresponding original image from the original image storage database unit at any time. After all the original images are acquired, the detection unit detects the two-dimensional location of the black-and-white checkerboard pattern in the camera, continuously tests the analyzed image data, rectifies image distortion and aberration, and finds out the conjugate point of many pictures. The image rectification unit rectifies the distorted images acquired by one or more cameras. The image combination unit detects the similarity of many pictures, acquires the parallax between the pictures, and combines all the acquired images into a one-frame image by the image fitting technology to generate a binary image. The image combination unit can also remove the noise and fix the white leakage by the common image processing technology. The rectified and combined image is output to the intelligent selection unit which automatically cuts and removes the non-book image area from the background of the book image group, identifies the book boundaries, makes the spine, fore edge and front cover, and stores them in the processed image storage database unit.

Figure 7:
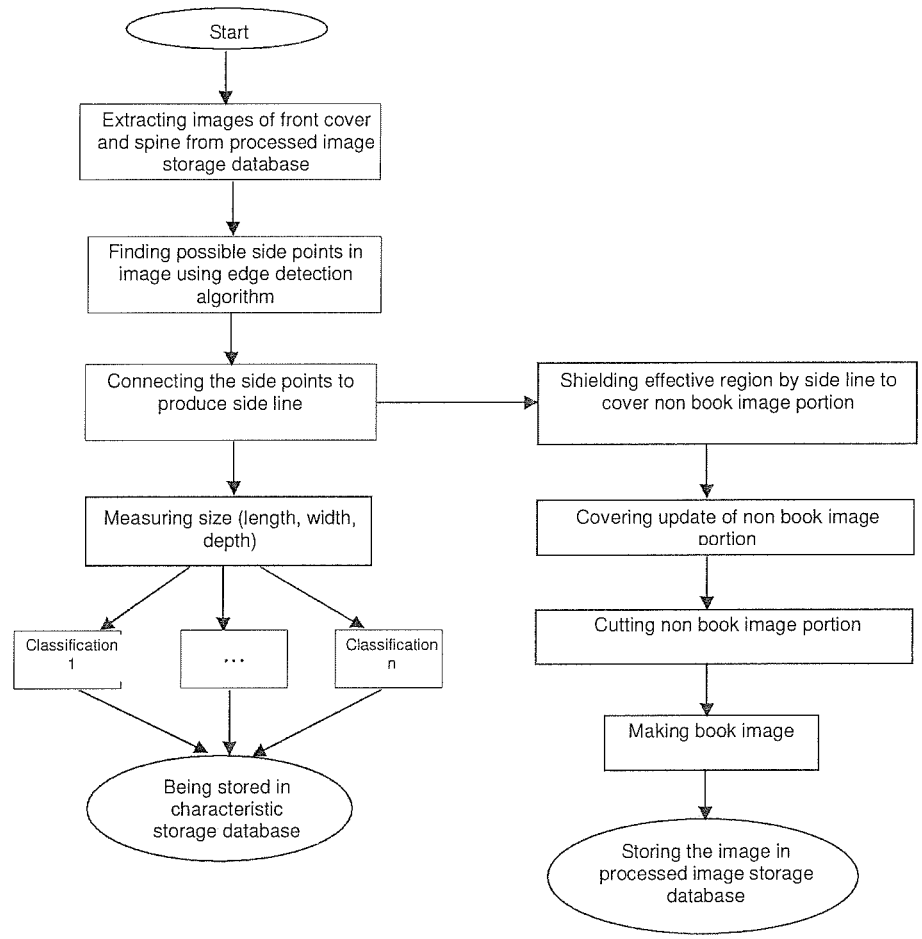
FIG. 7 is a flowchart showing the extract of an image template of the invention.

The image size measurement unit in the image analysis sub-module is configured to measure the length, width and thickness (also called depth) of the book. Measuring these characteristics of the book needs the edge detection algorithm, international standard format, topology characteristic and optical character analysis to extract the image characteristics. See FIG. 7, the edge detection algorithm judges the location of the side line by the differential operation as a tool and a function using the grey scale as the parameter. First, from left to right and from top to bottom, the seed points are selected in the image line by line, the central image element of the seed points is compared with the adjacent image elements in four directions to find the seed points with a certain edge strength, and these seed points are connected to form a closed boundary and calculate the book size (length, width and thickness). With reference to the values of side length, point of intersection and angle of intersection of the length, width and thickness of the book, a very accurate book size is calculated. Subsequently, the intelligent selection unit automatically cuts and removes the non-book image area and identifies the book edge (for example, the book edge displayed by a red line). Specifically, the non-book image area to be cut and removed is found by the absolute value between the difference of background and book image results, meanwhile, a binary output is generated by the background maintenance algorithm to remove the image mixed color, and an adder updates the cut and removed book image, which is efficient for the extract of related book image characteristics.

Figure 8:
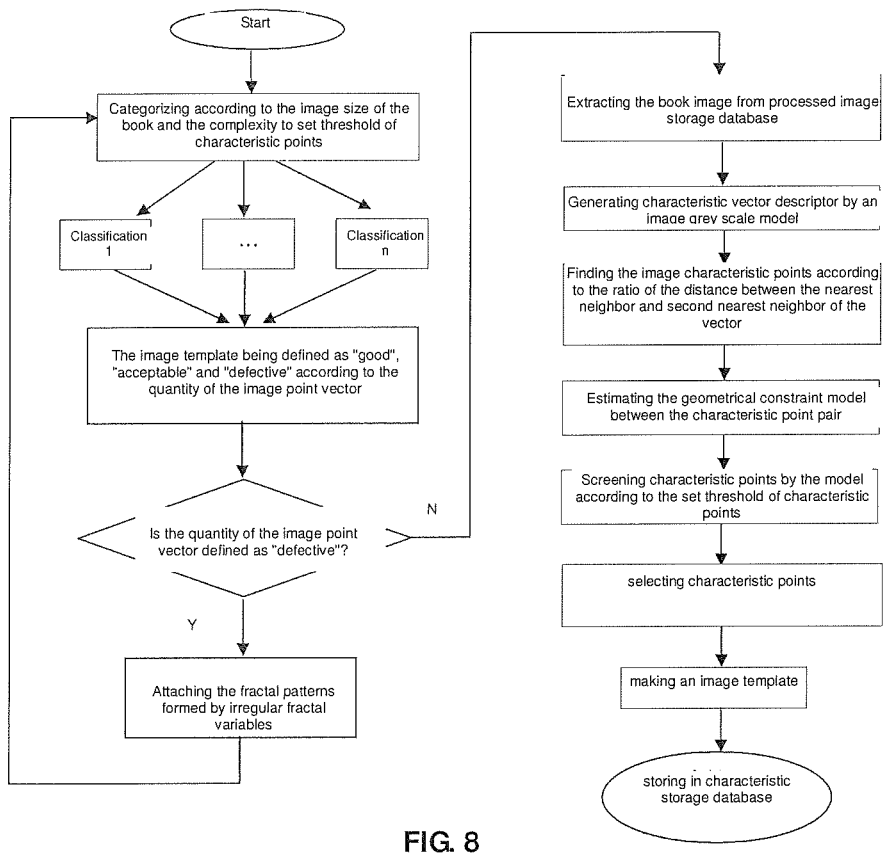
FIG. 8 is a flowchart showing the measurement of the size of the book based on the edge detection algorithm of the invention.

Meanwhile, see FIG. 8, first, stable characteristic points are extracted by the image template extraction unit in the image analysis sub-module based on the image characteristic point extracting algorithm and categorized according to the image size of the book and the complexity of the image template, the descriptor of the image point vector is calculated, the image characteristic points are extracted (the so-called image characteristic point of the book is the point which can be used as the characteristic identifier in the book image, for example, an all-white or all-black book has no characteristic point, while the book which has many irregular patterns or is rich in color has many characteristic points), the image template is defined as "good", "acceptable" and "defective" according to the quantity of the image point vector in the image template, which is determined by the statistics, and the "defective" definitely means that the book has no image and only has one color. If the image template is defined as "defective", it is required to attach the fractal pattern color on the book image to increase the quantity of the image point vector. The so-called fractal pattern is a well-known technology. Benoit Mandelbrot, mathematician, found that the quadratic iteration formula, $z_{n+1}=z_n^2+c$, $z_0=c$ can generate an infinite number of fractal patterns with the equation of $z=z^2+c$, $c=a+bi$, where a and b can generate an infinite number of fractal patterns by inputting different numbers. This algorithm uses the Scale Invariant Characteristic Transform (SIFT) characteristic extraction method, which is a public scale invariability characteristic change method. The more even the distribution of the characteristic points is in the image, the more stable the effect of matching the characteristic points is, and the stable characteristic point is the dispersed image characteristic point. Because of the difference of brightness of the environment for acquiring images, the difference of reflectivity on the front cover, the difference between the direction of the front cover and the direction of the camera, the color and brightness of the images on the same projection point will be different, and the image characteristic point extracting algorithm is used for solving such problem. Specifically, for the book image processed by the computer vision image processing module, its characteristic vector descriptor is generated by an image grey scale model, and the image characteristic points are preliminarily screened according to the ratio of the distance between the nearest neighbour and second nearest neighbour of the vector. There may be many characteristic points which can be the characteristic points as along as the near points are different, and the preliminary screening is to compare the near points first to find many characteristic points. Finally, the characteristic points are further selected by the geometrical constraint model between the estimated characteristic point pair to determine the quantity of characteristic points and use the quantity of the selected characteristic points as the threshold. The threshold of the characteristic point is the pointer for making the quantity of the characteristic point. For example, the finger models of different people have different characteristic points, and the operation and processing speed is slow if there are too many characteristic points, in contrast, the accuracy is lower if there are very few characteristic points. The measures above make an image template based on the balance point, just like making the finger template for verifying the identity of people for a self-clearance system, while the book image template can be used for the self-return of book after the working day. The matching relationship of a point set is output (the so-called matching relationship of a point set is that, during the matching, the real-time image is divided into many sub-areas and the matchability of the image is distinguished by the grey scale standard difference and spectral histogram of the sub-areas, and the constraint matching result of the location distribution relationship of respective sub-areas is the matching relationship), so as to obtain a long sequence which is used for representing the image characteristic of the book and stored in the characteristic/image storage database unit.

Figure 9:
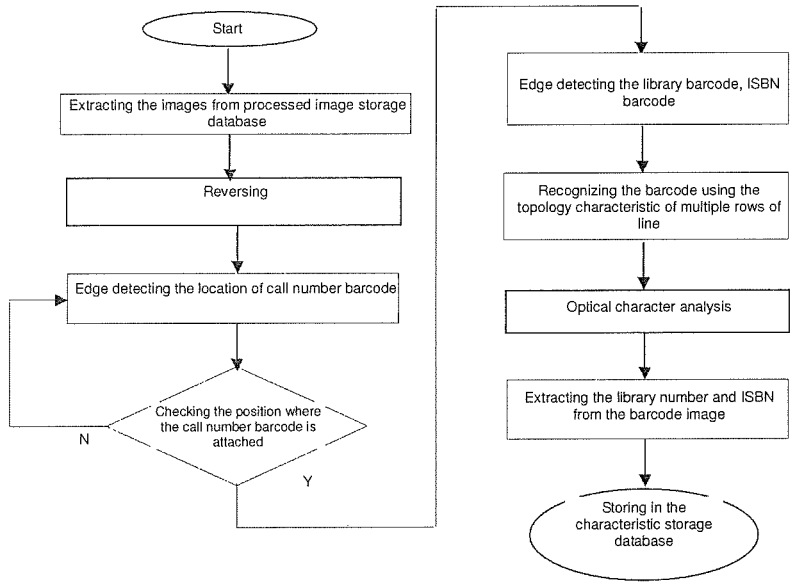
FIG. 9 is a flowchart showing the extract of a barcode based on the edge detection algorithm and optical character analysis of the invention.

The edge detection algorithm is further used for searching the locations of the call number barcode, library barcode and ISBN barcode. See FIG. 9, the library barcode recognition unit finds the location of the library barcode by the topological characteristics of the lines in many rows of the barcode to extract the image of the library barcode. The ISBN barcode recognition unit finds the location of the ISBN barcode also by the topological characteristics of the lines in many rows of the barcode to extract the image of the ISBN barcode. In the call number barcode recognition unit, because the location of the call number barcode attached on the spine is specific, it is easy to determine the location of the spine call number, so as to extract the image of the call number barcode. The threshold analysis and selection unit finds and sets the most optimal model threshold, systematical distortion and size error value and matching audit. The optical character analysis unit extracts the library number, ISBN and call number from the barcode image and stores these numbers in the characteristic/image storage database unit.

The characteristic/image storage database unit is configured to store the book image and book characteristics. The book image includes the image templates of the front cover, spine, back cover and fore edge, and the book characteristics includes length, width, depth of the book and size category, weight and weight category, ISBN location, library barcode location, call number location, RFID tag location, RFID tag chip number, ISBN, library barcode number, call number, and the record information of the read/written RFID tag chip.

The RFID tag data storage module is configured to define the access unit location where the tags of all the images and book characteristics are stored in the chip. The memory of E2PROM in the chip is divided into many sectors which are not interfered with each other, and different passwords and access control as required are set for each sector. Each sector has many blocks, and each block is an access unit. The RFID tag reader/writer reads and writes the book characteristics stored in the chip according to the unique access unit location.

The RFID tag reading/writing module includes reader/writer firmware and an RFID tag location analysis unit. The reader/writer firmware is configured to sense and read/write the RFID tag chip in the book, and find the location of the RFID tag in the book by the array RF antenna group, and connected with the RFID tag data storage module to write the book characteristics in the RFID tag chip in the book. While the RFID tag location analysis unit identifies the location of the RFID tag on the book by the non-contact electromagnetic induction. The location of the RFID tag is stored in the book enrolment data storage database unit.

The monitoring engine module is provided for the operator to remotely or locally manage and monitor the information of the book enrolment management apparatus, and includes a module running status reporting unit and an automatic repair unit. The module running status reporting unit continuously extracts the current running status from the computer vision image processing module and the RFID tag reading/writing module. In case of failure, the module running status reporting unit creates a failure log and sends the information of the failure status to the book operator. The automatic repair unit, according to the detected improper running, starts the repair operation without interfering the system application or service program in order to ensure that the whole system is not subject to the influence of stability and accuracy due to data loss or damage.

The prompt running module sends a voice control signal to a voice prompt device by the voice prompt control unit and sends a flash control signal to a flash prompt device by the flash prompt control unit at the same time to notify the book operator of the enrolment management status.

The management service module is mainly configured to let the operator remotely monitor the book enrolment management apparatus and exchange the information of the apparatus, and includes a reporting unit, an upgrade unit, a parameter setting unit, a data extraction and download unit and an image area setting unit. The reporting unit sends the current running status (for example, the failure conclusion made by the module monitoring engine) of each module in the apparatus to the computer monitored by the operator. Indeed, the operator can also access the server through the local area network to find out the abnormality and failure information. The upgrade unit is configured to upgrade and update the firmware and software of the device by a local port or a remote network. The operator can input the related parameters of each module by the parameter setting unit to set the system setting value. The data extraction and download unit is provided with an interface and can extract and download the book image characteristic from the database at any time. Subsequently, the image area setting unit can freely select or define a specific image area to reduce the amount of calculation of each analysis module by locally detecting the area, thereby implementing the fast image analysis.

The whole working process of the book enrolment management apparatus of the invention is described below.

Figure 10:
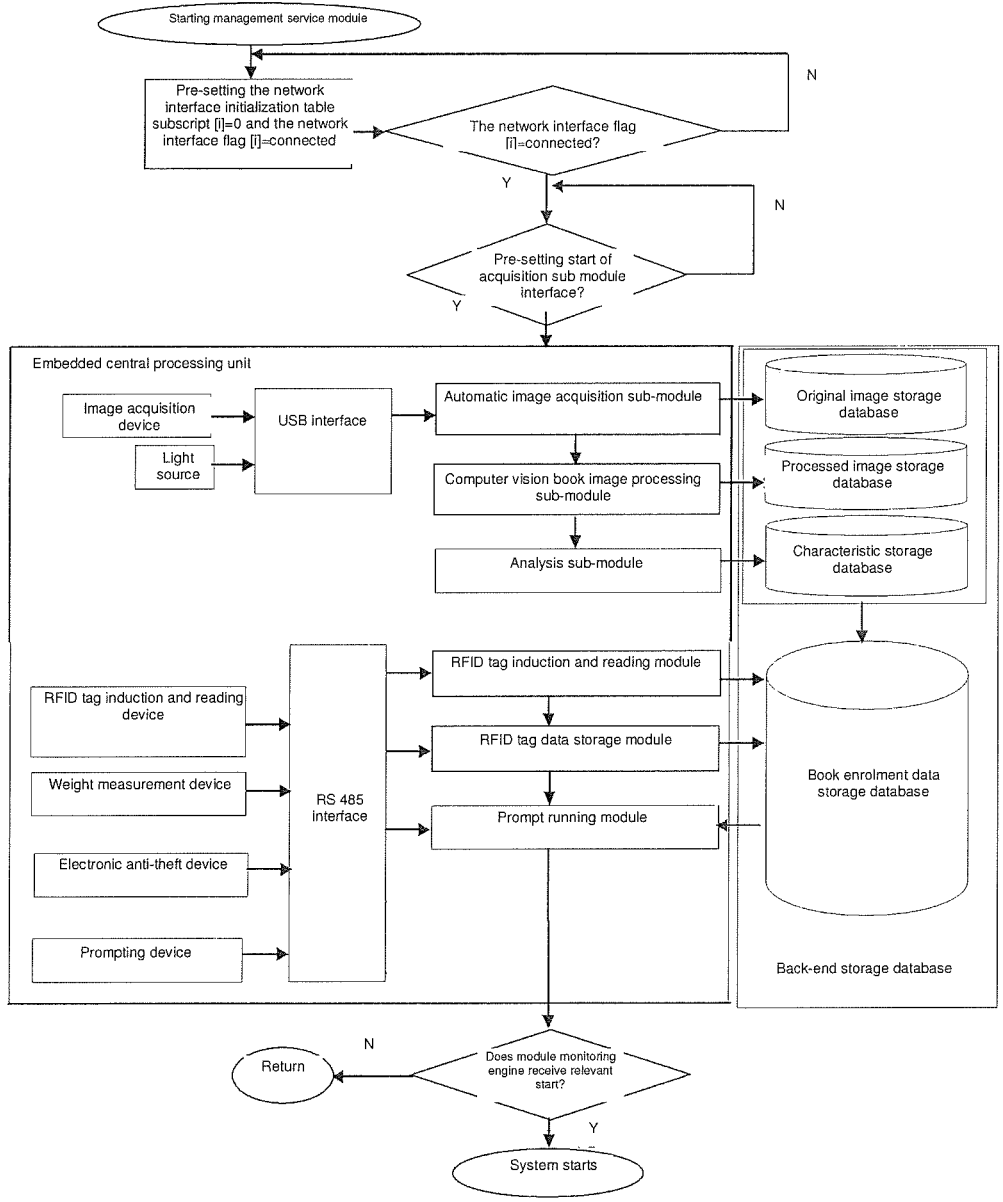
FIG. 10 is a flowchart showing the initialization of starting the book enrolment management apparatus of the invention.

First is the start initialization flow of the book enrolment management apparatus. See FIG. 10, under the condition that the network is connected and the image acquisition apparatus 11 is started, the image acquisition module, computer vision image processing module, RFID tag reading/writing module and prompt running module are started in turn, and whether the module monitor engine accepts the related start is judged, if so, it means that the system applications or service programs are started completely.

To register books, it is required to start the application which will display the initialization interfaces and initialize the software and hardware in the background. If some initializations are not completed (such as, failing to connect with the database), the program will provide the related information and close the application. If all the initializations are completed, the program will activate the image acquisition apparatus 11. The program needs to define the background image during each activation to adapt to different illumination environments, so, before the formal enrolment, it is not allowed to put sundries on the surface of the image acquisition working platform 12, and when the program sets the background image without sundries successfully, the program initialization is completed formally.

Figure 11:
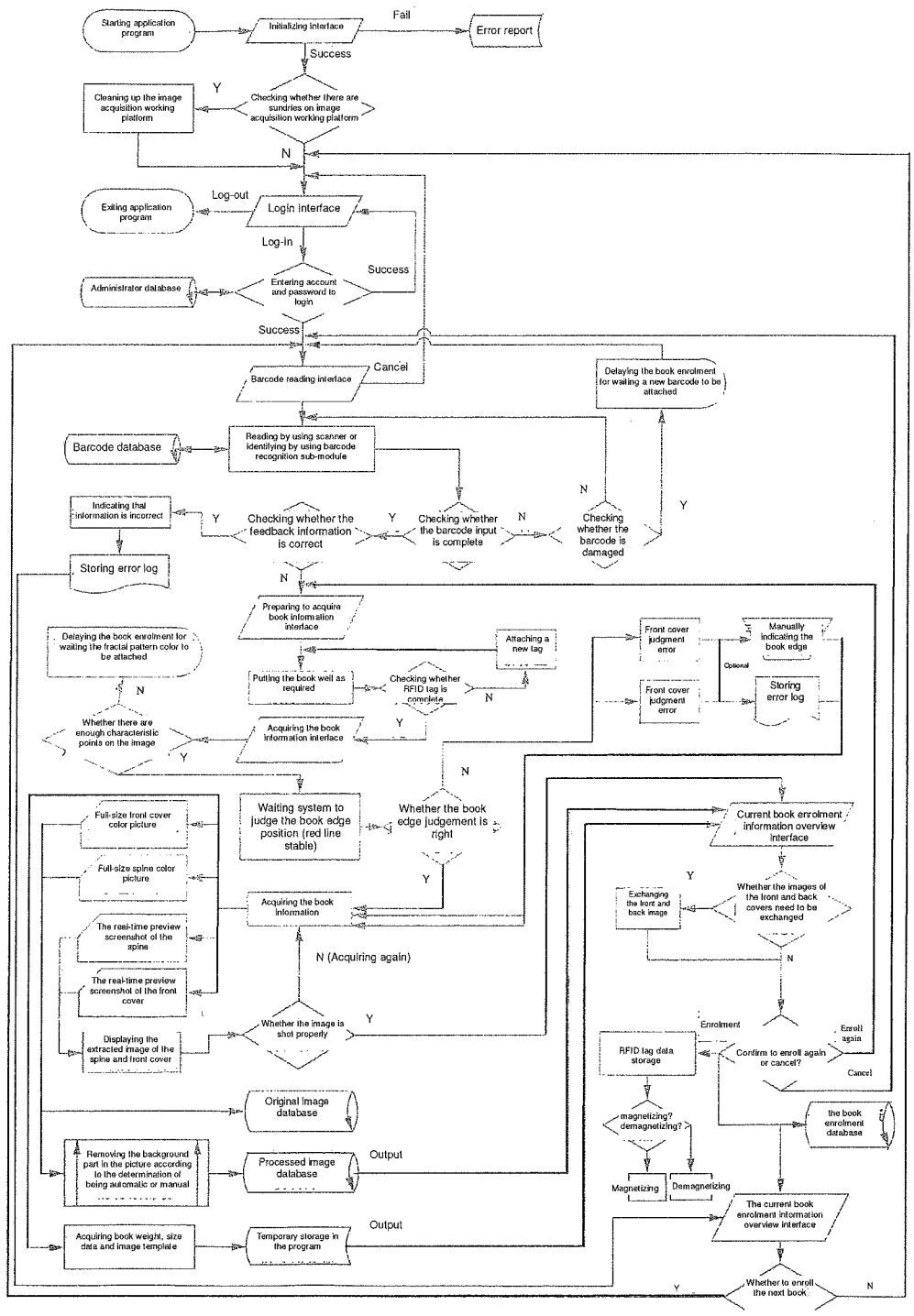
FIG. 11 is a diagram showing the implementation flow of the book enrolment management apparatus of the invention.
Figure 12:
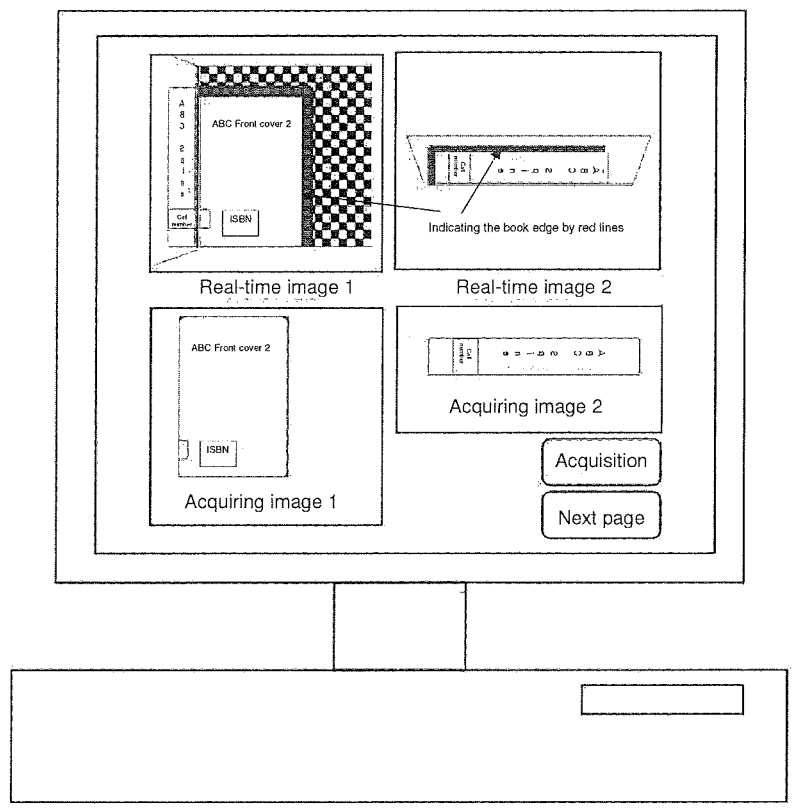
FIG. 12 is a diagram showing the book edge displayed by red lines according to the invention.

FIG. 11 is a flowchart of implementing the steps, see FIG. 11. First, a user accesses the login interface, and can exit the program at the interface if wanting to cancel the book enrolment. The user needs to be identified by the system if wanting to continue the book enrolment. After successful login, the RFID tag reading/writing module reads the RFID tag to confirm that the book may be registered. If there is no RFID tag or the tag is damaged, the user is prompted to attach a new tag. After the RFID tag reading/writing module senses the RFID tag attached in the book, the first step of book enrolment can be executed: barcode acquisition. There are two methods for inputting the barcode information of the book to the system in the invention: 1, reading the library barcode by a library barcode scanner fixed at one corner of the image acquisition working platform 12; and 2, acquiring the barcode number by the library barcode distinguishing unit and optical character analysis unit. After acquiring the library barcode information by any one of the methods above, the system will extract the corresponding book information record from a library barcode database provided by the library. If, at this moment, the library barcode database feeds back error information, the user needs to check whether the barcode acquisition is incorrect, if so, the user will delay the book enrolment and attach a new barcode; if the library barcode database feeds back related information, the operator will check whether the feedback information is correct (such as, book name, edition information), if not, the operator will indicate that the feedback information from the library barcode database is incorrect, create and store a data record error log, and delay the book enrolment until the library barcode database is corrected; and all the error logs are stored in the book enrolment data storage database unit. If the feedback information from the library barcode database is correct, the second step of book enrolment can be executed: book characteristics information acquisition. First, the user puts the book well at a preparation interface according to the prompt and can access the front cover information acquisition interface. At the moment, the user can see the real-time images of the front cover and spine at the interface. The image acquisition module acquires the book image on the image acquisition working platform 12 and stores it to the original image storage database unit. The computer image making sub-module in the computer vision image processing module rectifies and combines the original images and stores them to the processed image storage database unit. The analysis sub-module in the computer vision image processing module analyzes the processed images, and judges whether the front cover has enough characteristic information, the length, width and depth (thickness) information of the book and the weight information of the book. First, the system will analyze whether the front cover has enough characteristic points, and, if not, the system will prompt to delay the book enrolment until enough characteristic points are increased by coloring with a fractal pattern and attaching the same on the book. If there are enough characteristic points, the system will continue analyzing the length, width and depth (thickness) information of the book, see FIG. 12 which is a diagram showing the book edge displayed by red lines according to the invention. When two groups of red lines for displaying the system analysis information are stable on the interface, it means that the intelligent selection unit has completed analyzing the book edge information, and if the user finds that the system analysis is incorrect (for example, the book edges and cut side lines are so far from each other), it is required to indicate whether the length/width information or depth (thickness) information judgment is serious in deviation or error. After reporting the error, the user can select the following two solutions: (1) extracting the original image including the background from the system at once and manually cutting the correct images of the front cover and spine to guarantee the correctness of length, width and depth and characteristic image information of the book; and (2) recording the serious deviation error log in judgment by the system for future modification.

If the analysis of the book edge information is normal, the system will automatically acquire the book information and process many tasks in parallel: 1, storing the acquired book weight, size data and image template to a temporary storage in the program; 2, acquiring the images of the front cover and spine, storing the two full-size book images to the original image storage database unit, cutting and removing the non-book image area in the original image according to the size information of the book, and storing the cut image in the processed image storage database unit; and 3, during the acquisition, displaying the real-time preview screenshot of the front cover and spine. Here, the reason for using the screenshot display is that the time for processing and displaying the full-size high-resolution image is more than ten times that for low-resolution screenshot display, and the main purpose is that the screenshot can be displayed on the screen interface immediately, meanwhile, the system background can process the full-size image, so that the user can immediately confirm whether the program has cut the image correctly. If selecting to acquire the front cover information, the user needs to put the book well according to the prompt and access the front cover information acquisition interface. At the moment, the user can see the real-time image of the front cover at the interface. At the interface, the system will judge the length and width information of the front cover again to extract the image, without judging the book depth any more. The operating flow is identical to the formal acquisition of the front cover information. After completing the acquisition of the front cover information, the user will also confirm and store the book characteristics information.

When accessing the current book enrolment information overview interface, the user can see the text data (book name, author, press, etc.) acquired from the barcode database, the processed color pictures of the front and back covers and spine output from the processed image storage database, whose non-book image area is cut and removed, and the calculated book size information and weight information output from the temporary storage at the interface. Here, the user needs to confirm whether the pictures of the front and back covers are correct, if not, he will exchange them.

All the acquired image characteristic data will be stored in the characteristic/image storage database unit for backup. Furthermore, the user confirms whether all the information in the interface is correct, and can return to the preparation interface to register the book again if any information is wrong or missing. If the enrolment is cancelled, any data of the book is not saved to exit to the barcode acquisition interface. If all the information is correct, all the book images and characteristics are stored in the book enrolment data storage database unit, and the RFID tag data storage module writes the related data of the book, including the image templates of the front cover, spine, back cover, and fore edge, and the book characteristicss, including book size and size category, weight and weight category, ISBN location, library barcode location, call number location, RFID tag location, RFID tag chip number, ISBN, library barcode number, call number, and the record information of the read/written RFID tag chip, into the RFID tag attached in the book by the RFID tag reader/writer, and then the user can select to the magnetism of the magnetic strip. Meanwhile, the application accesses the current book enrolment information overview interface which displays the status of currently registered books in the form of list, and the books not registered can be linked to the step for enrolment again by different error logs. In the interface, the user can select to register the next book or exit to the login interface, and meanwhile, save the log of the current book enrolment to complete the current enrolment. In the login interface, the user can select to exit the application, as such, the book enrolment flow is completed.

The embodiments above are provided for those skilled in the art to implement or use the invention, and various medications or changes of such embodiments can be made by those skilled in the art within the inventive idea of the invention, so that the scope of protection of the invention shall comply with the maximum range of innovative characteristics provided by the claims, instead of being limited by such embodiments.

The invention claimed is:

1. A computer vision and Radio Frequency Identification (RFID) technology based book enrolment management apparatus, comprising: an image acquisition working platform, an image acquisition device, an RFID tag reader/writer and antenna group an electronic anti-theft magnetizing/demagnetizing device, a weight measurement device, an embedded central processing unit, and embedded firmware modules wherein;

the image acquisition working platform provides an operating platform which makes images of a spine, a fore edge of a book and an image group of a first cover of the book, defining the front cover of the book on a common optical acquisition plane connected with one another, with the images of the spine and fore edge reflected to a camera group having an image acquisition range for performing real-time and synchronous shooting to acquire the images in the directions of the spine, fore edge and front cover of the book;

wherein the image acquisition working platform comprises a chessboard for placing the book, with the chessboard having a pattern to reference the camera group, a transparent baffle group, and a reflector mirror group, and with the transparent baffle group vertically arranged at a corner of the image acquisition working platform to form a right angle to which the book is tightly close in order to ensure that the spine and fore edge can also be completely close to the transparent baffle group, and with the reflector mirror group obliquely arranged at the other edge of the transparent baffle group to form an angle with the image acquisition working platform in order to completely reflect the images of the whole spine and fore edge to the image acquisition range of the camera group installed above;

the image acquisition device is comprised of the camera group and arranged above the image acquisition working platform to acquire the image of the spine, fore edge and front cover of the book representing some of the acquired image(s) of the book on the image acquisition working platform;

the RFID tag reader/writer is connected with the antenna group and configured to read/write a RFID tag;

the antenna group consists of multiple RF antenna elements in which adjustment circuits are arranged to adjust the RF antenna elements to increase their sensitivity, and is arranged below the image acquisition working platform;

the electronic anti-theft magnetizing/demagnetizing device is configured to activate or deactivate magnetism of a anti-theft magnetic strip in the book;

the weight measurement device is arranged below the chessboard of the image acquisition working platform and is adapted to weigh the book on the image acquisition working platform; and the embedded central processing unit is configured to control and operate all embedded firmware modules which comprise an image acquisition module, a storage module, a computer vision image processing module, an image analysis module, an RFID tag reading/writing module, an RFID tag data storage module, a monitoring engine module, a management service module and a prompt running module.

2. The computer vision and RFID technology based book enrolment management apparatus according to claim 1, wherein an image acquisition module of an embedded firmware module comprises:

a manual image acquisition sub-module which is a multiple-lens image acquisition system and can acquire the image group of the book in sequence or simultaneously;

a light source control sub-module which is configured to provide and control an efficient and even light source for the image acquisition; and an automatic image acquisition trigger sub-module which is connected with the manual image acquisition sub-module to automatically trigger the image acquisition module to realize the image acquisition function by the image change within the image acquisition range.

3. The computer vision and RFID technology based book enrolment management apparatus according to claim 1, wherein the storage module is connected with the image acquisition device and the computer vision image processing module, and comprises an original image storage database unit and a book enrolment data storage database unit; the original image storage database unit is configured to store the acquired image of the book, and the book enrolment data storage database unit is configured to store and analyze book characteristics from the acquired image(s) of the book.

4. The computer vision and RFID technology based book enrolment management apparatus according to claim 1, wherein the computer vision image processing module is connected with the image acquisition device to make the acquired image(s) of the book into a two-dimensional book image and analyze the two-dimensional book image to acquire the book characteristics, and is provided with a computer image making sub-module for making the two-dimensional book image, wherein the computer image making sub-module further comprises:

a detection unit which is configured to detect the location of the reference pattern of the camera group in the camera in two dimensions;

an image rectification unit which is configured to rectify distorted images acquired by one or more cameras;

an image combination unit which is connected to the image rectification unit to combine the rectified images for detecting similarities and differences between multiple images;

an intelligent selection unit which is configured to automatically cut and remove from the acquired image(s) of the book any non-book image area content according to the image acquisition working platform in the acquired image(s) of the book, identify the characteristics of the book and make the spine, fore edge and front cover; and a processed image storage database unit which is connected with the intelligent selection unit and configured to store book images processed in the processed image storage database unit.

5. The computer vision and RFID technology based book enrolment management apparatus according to claim 1, wherein the computer vision image processing module is further provided with an image analysis sub-module which is configured to analyze the acquired image(s) of the book to determine its book characteristics, the image analysis sub-module further comprises;

an image size measurement unit which is configured to calculate from the book characteristics its length, width and depth;

an image template extraction unit which is configured to extract a template of the book according to the characteristics of the book;

a library barcode recognition unit which is configured to recognize a library barcode and a location of the library barcode and extract an image of the library barcode;

an International Standard Book Number (ISBN) barcode recognition unit, which is configured to recognize an ISBN barcode and a location of an ISBN barcode and extract an image of the ISBN barcode;

a call number barcode recognition unit, which is configured to recognize a call number barcode and a location of the call number barcode and extract an image of the call number barcode;

a threshold analysis and selection unit which is configured to find and set an optimal model threshold, a system distortion and size error value and a matching audit;

an optical character analysis unit which is configured to analyze character information from the extracted images of the library barcode, ISBN barcode and call number barcode; and a characteristic image storage database unit which is configured to store the book image and the book characteristics; wherein the book image comprises image templates of the acquired image(s) of the book including an image of the front cover, spine, back cover and fore edge, and with the book characteristics including its length, width, depth of the book and size category, weight and weight category, ISBN geometrical location, library barcode geometrical location, call number geometrical location, RFID tag geometrical location, RFID tag chip number, ISBN, library barcode number, call number, and record information of the RFID tag read/writer chip.

6. The computer vision and RFID technology based book enrolment management apparatus according to claim 1, wherein the RFID tag data storage module is configured to define an access unit location where the tags of all the acquired images of the book and characteristics of the book are stored, and the access unit location is provided for the user to read/write stored book characteristics.

7. The computer vision and RFID technology based book enrolment management apparatus according to claim 6, wherein the RFID tag reading/writing module is connected with the RFID tag data storage module and further comprises:
   reader/writer firmware which is configured to read/write the characteristic of the RFID tag reader/writer in the book, and read/write characteristics of the book from/into the RFID tag reader/writer in the book based on the access unit location in the RFID tag data storage module; and
   an RFID tag location analysis unit which is configured to identify a location of the RFID tag in the book using non-contact electromagnetic induction.

8. The computer vision and RFID technology based book enrolment management apparatus according to claim 1, further comprising:
   a monitoring engine module which is connected with each component of the book enrolment management apparatus to monitor a running status of the computer vision and RFID technology based book enrolment management apparatus and further comprises:
   a module running status reporting unit which is configured to extract the running status of each component in the computer vision and RFID technology based book enrolment management apparatus, create a failure log, and send the information of the failure log for each component to a specified record location; and
   an automatic repair unit which is configured to repair the component having a created failure log without interfering with a system application or service program of the computer vision and RFID technology based book enrolment management apparatus.

9. The computer vision and RFID technology based book enrolment management apparatus according to claim 1, further comprising:
   a management service module which is provided for a operator to remotely or locally manage and monitor information in the book enrolment management apparatus;
   an upgrade unit which is configured to upgrade firmware or software through a local port or a remote network;
   a reporting unit which is configured to send the running status of each module in the apparatus to the operator;
   a parameter setting unit which is provided for the operator to input related parameters of each module in the apparatus and set a system setting value;
   a data extraction and download unit which is configured to extract and download data and automatically establish a related data download connection; and
   an image area setting unit which is configured to select or define an particular range of image region in an original image of the storage module in order to manually cut out a correct image of the front cover or spine.

10. The computer vision and RFID technology based book enrolment management apparatus according to claim 1, further comprising:
   a prompt running status module which is configured to determine the running state of the book enrolment management apparatus and to send a prompt signal to a operator according to the running state, and further includes:
   a voice prompt control unit which is configured to notify the operator of a enrolment management status by a voice signal; and
   a flash prompt control unit which is configured to notify the operator of the enrolment management status by an optical signal.

* * * * *

UNITED STATES PATENT AND TRADEMARK OFFICE
CERTIFICATE OF CORRECTION

PATENT NO. : 8,885,048 B2
APPLICATION NO. : 13/519071
DATED : November 11, 2014
INVENTOR(S) : Hanguang Liu Page 1 of 1

It is certified that error appears in the above-identified patent and that said Letters Patent is hereby corrected as shown below:

On the title page item (57), should read:

The invention discloses a computer vision and radio frequency identification technology based book enrolment management apparatus, which comprises an image acquisition working platform, an image acquisition device, an RFID tag reader/writer and antenna group for extracting information characteristics of the book to control and operate embedded firmware modules to analyze the image acquired information characteristics of each registered book, and record them in a storage database and RFID tag.

Signed and Sealed this
Thirtieth Day of June, 2015

Michelle K. Lee
*Director of the United States Patent and Trademark Office*